UNITED STATES PATENT OFFICE.

VICTOR LENHER, OF MADISON, WISCONSIN, AND FRANK M. DORSEY, OF CLEVELAND, OHIO; SAID DORSEY ASSIGNOR OF HIS RIGHT TO GENERAL ELECTRIC COMPANY, A CORPORATION OF NEW YORK.

METHOD OF PURIFYING CARBON.

1,423,231. Specification of Letters Patent. Patented July 18, 1922.

No Drawing. Application filed September 18, 1920. Serial No. 411,258.

*To all whom it may concern:*

Be it known that we, VICTOR LENHER, a citizen of the United States, residing at Madison, in the county of Dane and State of Wisconsin, and FRANK M. DORSEY, a citizen of the United States, residing at Cleveland, in the county of Cuyahoga and State of Ohio, have invented a new and useful Improvement in Methods of Purifying Carbon, of which the following is a specification.

This invention relates particularly to activated charcoal and the like, and a method of purifying carbon.

The primary object is to provide an improved activated product and an improved method of producing a purified product.

It may be stated preliminarily that a commonly employed method of producing activated charcoal is that of subjecting ordinary charcoal to the action of steam at high temperature, say a temperature of about 700° to 1100° C. This results in a certain purification of the charcoal and the production of a more or less porous structure. The process involves the expenditure of much energy in generating the steam and raising the materials to high temperatures, and the resultant product is only partially purified and attains only partially the degree of porosity which is desirable.

According to the present process, commercial charcoal is treated with a solvent for hydrocarbons therein, the solution is removed, and the residue washed. The process yields a greatly improved product, of a high degree of purity and increased porosity. Such a product possesses great absorptive properities, and may be used more effectively than ordinary activated charcoal for absorption of gases, in those situations where the known activated product is employed. The improved process can be practiced at ordinary temperatures, or at moderately elevated temperatures. In any event, relatively moderate temperatures will suffice, say a temperature below 100° C.

The improved method may be employed for purifying and activating charcoal, ordinary coke, and similar carbonized materials, such as retort carbon, lamp-black, petroleum coke, etc.

In accordance with the preferred method, carbonized material, as for example charcoal, is subjected to the solvent action of selenium oxychloride ($SeOCl_2$), which is a solvent for numerous hydrocarbons and carbonaceous material, the excess solvent is then poured off or removed, the residue is then well washed with a solvent for selenium oxychloride, such as carbon tetrachloride ($CCl_4$) or chloroform ($CHCl_3$), and, finally, any of the second-mentioned solvent remaining in the treated carbon is expelled by distillation and may be recovered for future use.

The method yields a purified carbon of highly porous character, the product being an activated carbon much superior to products obtained by known methods.

We have discovered that selenium oxychloride possesses remarkable powers as a solvent and that it will dissolve numerous hydrocarbons, in some cases by ordinary solvent action and in other cases by entering into chemical reaction. Whatever the precise nature of the action may be in the present case, it seems clear that the selenium oxychloride dissolves the impurities in the carbonized material, and that this function is performed quickly and effectively throughout the interstices in the carbon structure. When the selenium oxychloride is drained off it carries with it the dissolved impurities. It remains, however, to free the carbon structure from such portion of the solution as remains in the structure. This is best accomplished by employing a volatile solvent for selenium, such as carbon tetrachloride, to wash out the solution, and then distilling off the carbon tetrachloride from the now porous carbon. It may be remarked that both carbon tetrachloride and chloroform are solvents for numerous hydrocarbons, but they do not possess the power of selenium oxychloride to quickly and effectively dissolve out the impurities from carbonized material. On the other hand, either of these solvents will dissolve the selenium oxychloride solution of hydrocarbons, and for this reason and because of their volatile character, serve as a desirable wash.

The carbonized material is preferably in the form of small pieces or lumps (or may be granular or even pulverulent) when subjected to treatment. If the purified material is to be used as activated carbon, as for absorption of gases, it is preferable not to reduce the material too finely. We have found it desirable to employ lumps or grains of from about 10 to 20 mesh.

The carbonized material may be soaked in selenium oxychloride for such length of time as may be necessary to dissolve the impurities. The time required will vary, depending upon materials treated, subdivision of materials, etc. Moderate heat may be applied, if desired, but this is unnecessary.

The solvent action of the oxychloride is ample to effect solution of the impurities of the carbonized material. However, we have discovered that the power of this substance and its range of action as a solvent are greatly increased by the introduction of some active compound, such as sulphur trioxide ($SO_3$). For instance, the addition of about 10% of $SO_3$ to selenium oxychloride gives an extremely strong solvent and one which will attack many substances which selenium oxychloride alone will not attack.

For the purpose of the present invention, either selenium oxychloride alone or selenium oxychloride compounded with a modifying agent may be used. In the case of $SO_3$, the modifying agent acts as an intensifying agent. If desired for any reason, the solvent power may be moderated by the introduction of a modifying agent which acts as a diluent. For example, carbon tetrachloride or chloroform may be employed as a diluent.

$SeOCl_2$ may be obtained in accordance with the process described in my application No. 381,628, filed in the U. S. Patent Office May 15, 1920.

The process described in the present application affords a practicable method of obtaining a superior grade of purified carbon at moderate cost. Such material may be used for various purposes. For example, it may be employed as an activated carbon in gas masks, or in the recovery of gasoline from natural gas. As a purified material, it may be employed in the manufacture of dry-cell batteries. The material may be employed, also, for electrode purposes, and for other purposes.

While it will suffice to soak the carbonized material in selenium oxychloride to effect solution of impurities, one may, if desired, first heat the carbonized substance to expel air; apply a vacuum, if desired; and then introduce selenium oxychloride under pressure. This will give better penetration, especially where large pieces of carbonized material are being treated.

As an example, one may introduce into a suitable vessel a quantity of carbonized nut shells, preferably broken to granular form of from 10 to 20 mesh; pour into the vessel a sufficient quantity of a solvent comprising selenium oxychloride to completely immerse the granulated material; allow the material to soak for a suitably prolonged period, which desirably ranges from one hour to ten hours, a period of a couple of hours being ordinarily sufficient; drain off the solution; wash the granulated material thoroughly with carbon tetra-chloride; and heat the washed material sufficiently to evaporate the carbon tetra-chloride remaining in it. For ordinary purposes, the solvent employed in the first instance may be selenium oxychloride diluted with carbon tetra-chloride, say in proportions of 75% selenium oxychloride and 25% carbon tetra-chloride. If desired, selenium oxychloride alone may be employed as the solvent in the first instance, but it is somewhat more economical to employ also a diluent of the character indicated above. The soaking operation may be at room temperature, but where it is desired to expedite the action, the materials undergoing soaking may be heated to any suitable temperature, preferably a temperature of 50° C. to 100° C. The diluent employed in the solvent may be any suitable diluent of a solvent nature, such as carbon tetra-chloride, chloroform, benzol or toluol. Where a considerable proportion of carbon tetra-chloride, for example, is used in the original solvent, the subsequent washing operation may be omitted, if desired. In such case, however, it ordinarily will be desirable to heat the granulated materials, after draining off the solution, to a temperature sufficient to drive off the solvent, it being remarked that the boiling point of selenium oxychloride itself is about 176° C.

The foregoing detailed description has been given for clearness of understanding only, and no unnecessary limitations should be understood therefrom, but the appended claims should be construed as broadly as permissible in view of the premises.

What we regard as new, and desire to secure by Letters Patent, is—

1. The method of purifying carbonized material which comprises subjecting the same to the action of a solvent comprising selenium oxychloride.

2. The method of purifying carbonized material which comprises subjecting the same to the solvent action of a solvent comprising selenium oxychloride, and removing the solution.

3. The method of purifying carbonized material which comprises subjecting the same to the action of a solvent comprising selenium oxychloride, removing the solution, and washing the residue.

4. The method of purifying carbonized material which comprises subjecting the same to the action of a solvent comprising selenium oxychloride, removing the solvent, washing the residue with a solvent for selenium oxychloride, and evaporating the second mentioned solvent.

5. The method of purifying carbonized material which comprises subjecting the same to the action of a solvent comprising selenium oxychloride, washing the residue with carbon tetrachloride, and then evaporating the carbon tetrachloride remaining in the product.

6. The method of activating charcoal or the like which comprises subjecting the material to the action of a solvent comprising selenium oxychloride, removing the solution, washing the residue with a solvent for the first mentioned solvent, and evaporating any solvent which may remain in the product.

7. The method of activating charcoal or the like which comprises treating the material at a moderate temperature with a solvent comprising selenium oxychloride, washing the product with a solvent for the first mentioned solvent, and evaporating any solvent which may remain in the product.

8. The method of activating charcoal or the like, which comprises treating the material at a moderate temperature with a solvent comprising selenium oxychloride, and removing the solution and washing the material, employing for the washing operation a solvent for the first mentioned compound.

VICTOR LENHER.
FRANK M. DORSEY.